H. E. LICHTENSTEIN.
PHOTOGRAPHIC APPARATUS
APPLICATION FILED JULY 6, 1914.
1,275,573.
Patented Aug. 13, 1918.
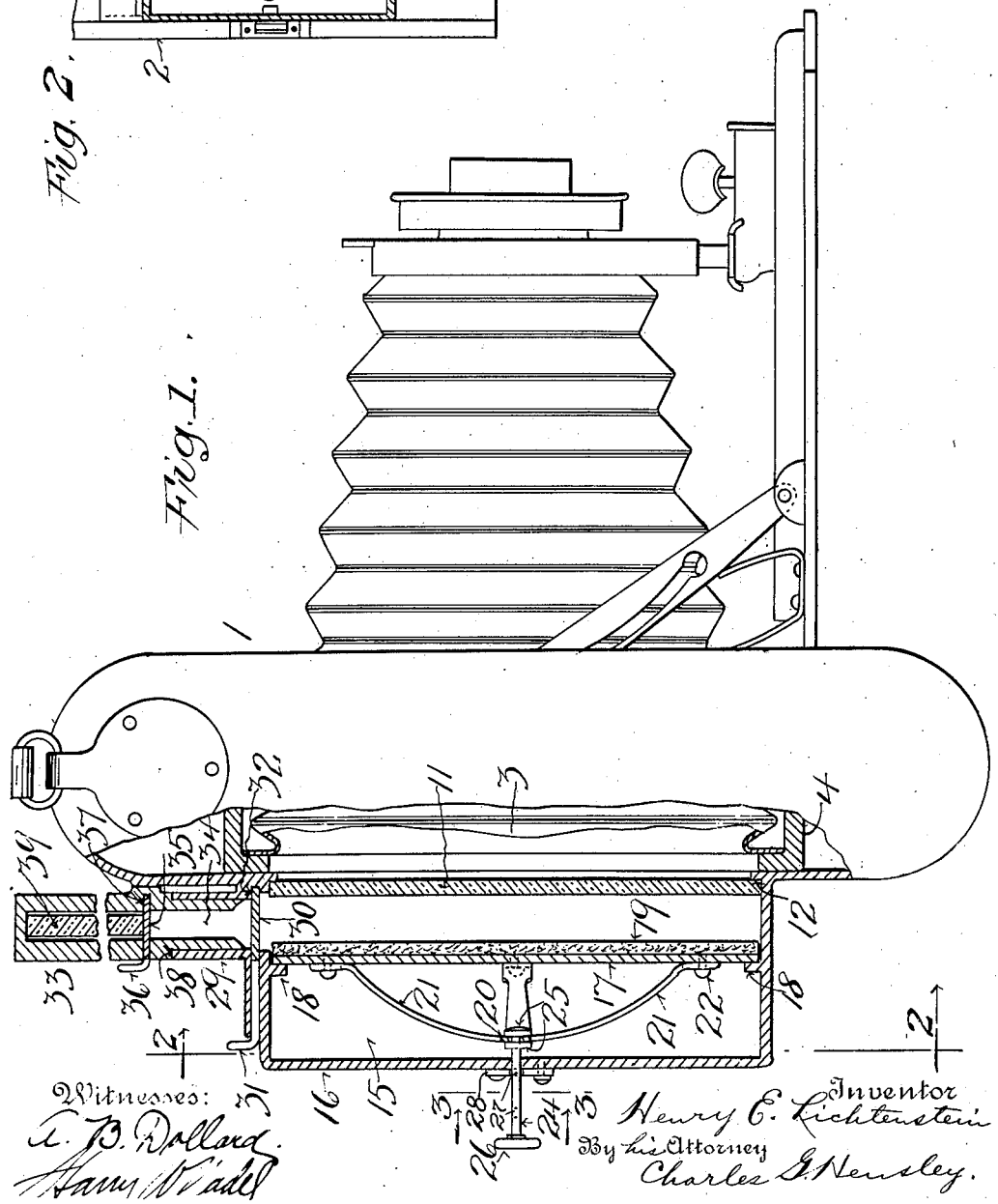

UNITED STATES PATENT OFFICE.

HENRY E. LICHTENSTEIN, OF WOODMERE, NEW YORK, ASSIGNOR OF ONE-HALF TO CHARLES G. HENSLEY, OF BROOKLYN, NEW YORK, AND SOLOMON K. LICHTENSTEIN, OF NEW YORK, N. Y.

PHOTOGRAPHIC APPARATUS.

1,275,573.  Specification of Letters Patent.  Patented Aug. 13, 1918.

Application filed July 6, 1914. Serial No. 849,030.

*To all whom it may concern:*

Be it known that I, HENRY E. LICHTENSTEIN, a citizen of the United States, and a resident of Woodmere, Nassau county, State of New York, have invented certain new and useful Improvements in Photographic Apparatus, of which the following is a specification.

My invention relates to photographic apparatus and more particularly to apparatus for taking photographs in color. One method of taking photographs in color is to expose a sensitized plate while in intimate contact with a colored taking screen, behind a lens, whereby a negative is formed having different finely divided portions thereof representing different color values, according to well known principles of color photography. In the process here referred to, the surface of the taking screen is composed of differently colored areas lying adjacent to one another in a regular pattern.

To be successfully used the completed picture must be viewed through a screen having its colored areas arranged in the same pattern and to exactly the same scale of sizes, as the screen through which the original was made. To accomplish this end it is essential that the sensitized plate and the original taking screen be in intimate contact throughout the exposure in the camera.

To effect this contact considerable pressure must be used, as any space between the sensitive plate and the taking screen would result in an image not exactly conforming to the pattern on the taking screen and would therefore result in a failure of the process, because the viewing screen having a similar pattern to the taking screen could not be made to register with the positive photograph.

In putting this process into practice it has heretofore been customary to place a sensitive plate and a taking screen face to face in a light proof or plate holder and to expose the plates singly in a camera.

This made it necessary to have a taking screen for each plate loaded in the plate holders and, as the taking screens are very delicate and will not stand handling, and as they cost considerable the method above referred to has not gone into very general use.

The only alternative was to use a single taking screen and to resort to a dark room to load the plate holder for the exposure.

Another obstacle has been that the colors in the taking screens as commercially made, very quickly fade when exposed to light and during the handling above referred to they are very apt to fade, thereby rendering them inaccurate.

The object of my invention, among others, is to make it possible to expose different plates, or other sensitized mediums behind the same taking screen; and to provide for changing the plates; and to provide means accessible from the outside of the camera, for bringing the sensitized plates into intimate contact with the surface of the taking screen by the application of pressure; and to provide for the release of this pressure to permit new plates to be positioned. By such means it is possible to secure better results than heretofore, and it is possible to use the same taking screen for all exposures. This eliminates the cost of the additional taking screens and eliminates the injury to the taking screens which was inevitably caused heretofore while handling them in placing them into and removing them from, the plate holders. Another advantage is, that the operator when once accustomed to the particular taking screen can secure more perfect results than where different taking screens are used for different exposures; because these screens, even when most skilfully made, are apt to vary slightly in their coloring.

Another object of my invention is to attach the taking screen to a permanent or removable portion of the photographic apparatus in such manner, that the screen will be protected from light to prevent the colors from fading, at all times except when the exposure is actually made.

The net result of the above is, that the taking of color photographs according to the method described is placed within the reach of the amateur, as well as the professional photographer.

In the drawing forming a part of this application,

Figure 1 is a side elevation, with the rear portion in section, of a camera embodying my invention as adapted for glass plates, in which view, the camera is shown unfolded or in focused position, Fig. 2 is a sectional view, taken on the line 2—2 of Fig. 1, and Fig. 3 is a sectional view, taken on the line 3—3 of Fig. 1.

The present invention may be embodied in different forms of cameras, whether of the box or folding type, and the present showing will be sufficient to teach the application of the invention to any well known form of camera.

Herein the camera 1 is of ordinary construction, except as herein otherwise described. In the casing 2 there is the usual bellows 3.

The colored taking screen 11 having its colored surface toward the rear of the camera, is here shown mounted in a groove 12ª in the interior frame 4 of the camera and it is preferably held in this groove by cement. This screen, as above stated, has its rear surface provided with differently colored areas lying adjacent to one another in a regular pattern.

At the rear of the camera and either integral therewith or detachable therefrom, I have provided an inclosing chamber 15 defined by the light proof casing 16. Within this chamber there is a pressure plate 17 which lies parallel to the screen 11 and which is movable toward and from the latter; and its rearward movement is limited by fixed stops 18 projecting into its path. The front surface of this plate is preferably provided with a pad 19 of resilient material such as felt, rubber, or the like, so that pressure and contact will be made on all portions of the sensitized plate behind the screen. To operate the pressure plate and to create the necessary pressure I prefer to use a spider 20 having several spring arms 21 extending in different directions from the middle, and preferably having the ends of these arms secured to the pressure plate by means of attaching screws 22 engaging in slots 23 in the arms. These several arms, as will be explained, are adapted to exert even pressure on all portions of the pressure plate.

There is an operating rod 24 passing through the spider and having shoulders 25 on either side thereof, so that movement of the rod in either direction will move the spider likewise. This rod passes through an aperture in the rear wall of the casing 16 so as to be accessible exteriorly of the light proof portion of the camera. The rod is shown provided with a finger knob 26, and with grooves 27. A swinging catch 28 pivoted to the casing 16 is adapted to engage in one groove 27 when the rod is pushed in, and to engage in the other when the rod is out, so as to hold it, and also the pressure plate, in either position.

I have shown the casing 16 provided with an upwardly extending throat 29 with which the plate holder may coöperate so that the plate can be transferred from the holder to the camera without the light striking it. This throat has a shutter 30 provided with an operating projection 31; and the shutter may be moved back and forth across the opening of the throat, a groove 32 being arranged to receive the edges of the shutter, to make it fit light tight.

The plate holder here shown simply consists of a rectangular box 33 having an open end, 34 which is adapted to be closed by a shutter 35 which is slidable across the open end of the holder. The shutter 35 has an operating handle 36 and there is a groove 37 to receive the edges of the shutter to make it light tight.

The open end 34 of the plate holder fits closely into the throat 29 when the plate holder is placed in loading position, and a shoulder 38 on the holder abuts against the top of the throat to exclude light.

The plate holder, in the preferred construction, is separable from the camera and there may be any number of them carried for use. When a plate is to be loaded into the camera the plate holder is placed in the position shown in Fig. 1, with the open end of the holder fitting snugly into the throat 29. Before and during the placing of the holder into position both shutters 30, 35, are in closed position. When the holder has been positioned as shown, no light can enter the holder or camera because their connection is light proof. The shutters 30, 35, are now both slid outwardly sufficiently to permit the sensitized plate 39 to drop from the holder into the camera, between the pressure plate and the taking screen. The plate holder may be left in the position shown during the exposure, or it may be removed, but in the latter case the shutter 30 is first closed to prevent light from entering the camera.

In Fig. 1 the pressure plate is shown released. In this position it permits the sensitized plate to be inserted in the camera. When the sensitized plate has been properly positioned, the catch 28 is turned to release the rod 24; and the latter is then pressed inwardly, carrying the pressure plate toward the screen; and the catch is thrown over again to engage in the outermost groove 27 to lock the rod. In this position of the parts the pressure plate 17 and its resilient pad 19 are forced against the sensitized plate and the latter is forced against the colored surface of the screen by the action of the spring arms 21 which are now under compression. This brings the sensitized surface of the plate and the colored surface of the screen into even and intimate contact throughout the exposure area. While the parts are in this condition the exposure is made by allowing the light to pass through the lens, and through the screen, to affect the sensitized surface of the plate in accordance with the colored pattern on the latter. The only light affecting the latter is that passing through the screen.

After an exposure has been made in the above described manner, the catch 28 is released and the rod 24 and with it the pressure plate, are drawn back to their rearward positions and there locked by throwing in the catch 28. All pressure on the sensitized plate by the pressure plate has now been removed, and the sensitized plate may be freely removed. These operations may be repeated as often as desired.

From the above it will be seen that the same screen, without handling, serves for all exposures; and that the sensitized plate is held in intimate contact with the screen during the exposure. It will also be apparent that the device may be manipulated without exposing the sensitized plate or screen to light and without the use of a dark room; and without danger of injuring the delicate surface of the screen.

When the rod 24 is locked, there will be a continuous and even pressure exerted against the pressure plate by the spring arms 21 and this causes the plate 39 to be pressed into intimate contact with the screen 11 throughout the exposure area. After the exposure has been made the rod 24 is released and the pressure plate is moved back away from the plate. If the holder has been removed, it must be replaced over the throat 29 and both shutters 30, 35 drawn out. If the camera and holder are now inverted the plate 39 will drop into the holder. After that both shutters may be closed and the holder may be detached from the camera. These operations may be repeated as often as desired.

It will be noted that the plate is evenly pressed against the taking screen so that they are both in close contact during exposure; that successive plates may be exposed behind the same screen; that the camera may be loaded and reloaded and manipulated in the light; and that the taking screen is protected.

Having described my invention, what I claim is:

1. A camera comprising a receptacle and a lens, a colored taking screen through which the rays from said lens pass, said receptacle having an opening to receive a sensitive medium, a shutter for closing said opening, means for pressing the sensitized medium into surface contact with said screen, and means operable from without the camera for applying and releasing the pressure.

2. A camera comprising a receptacle and a lens, a colored taking screen through which the rays from said lens pass, means for pressing a sensitized medium into surface contact with said screen, and means operable from without the camera for applying and releasing the pressure, said receptacle having an opening adapted to receive a sensitive medium between said screen and said pressure means.

3. A camera comprising a receptacle and a lens, a colored taking screen through which the rays from said lens pass, means for pressing a sensitized medium into surface contact with said screen and being movable away from the screen to permit of the insertion of a sensitized medium, means accessible from without the camera for operating said pressure means, a throat adapted to receive a sensitized medium and to permit its insertion between said screen and said pressure screen and light tight means for closing said throat.

Signed at the city, county and State of New York, this 3rd day of July, 1914.

HENRY E. LICHTENSTEIN.

Witnesses:
A. B. DOLLARD,
HARRY W. WADE.